(12) United States Patent
Fuyuki et al.

(10) Patent No.: US 11,474,655 B2
(45) Date of Patent: Oct. 18, 2022

(54) TOUCH PANEL DEVICE AND METHOD FOR DETECTION

(71) Applicant: Futaba Corporation, Mobara (JP)

(72) Inventors: Toshimitsu Fuyuki, Mobara (JP); Yuichi Tabata, Mobara (JP); Akio Miyajima, Mobara (JP)

(73) Assignee: Futaba Corporation, Mobara (JP)

( * ) Notice: Subject to any disclaimer, the term of this patent is extended or adjusted under 35 U.S.C. 154(b) by 0 days.

(21) Appl. No.: 17/495,288

(22) Filed: Oct. 6, 2021

(65) Prior Publication Data

US 2022/0113839 A1 Apr. 14, 2022

(30) Foreign Application Priority Data

Oct. 9, 2020 (JP) .............................. JP2020-171383

(51) Int. Cl.
*G06F 3/044* (2006.01)

(52) U.S. Cl.
CPC .......... *G06F 3/0446* (2019.05); *G06F 3/0448* (2019.05)

(58) Field of Classification Search
CPC .............................. G06F 3/0446; G06F 3/0448
See application file for complete search history.

(56) References Cited

U.S. PATENT DOCUMENTS

| 9,910,544 | B1* | 3/2018 | Yarosh | G06F 3/043 |
| 2015/0091859 | A1* | 4/2015 | Rosenberg | G06F 3/03545 |
| | | | | 345/174 |
| 2017/0024030 | A1* | 1/2017 | Wu | G06F 3/0443 |
| 2017/0307924 | A1* | 10/2017 | Liu | G06F 3/0448 |
| 2018/0095563 | A1* | 4/2018 | Mali | G06F 3/047 |
| 2018/0224977 | A1* | 8/2018 | Takahashi | G06F 3/041 |

FOREIGN PATENT DOCUMENTS

| JP | 2011090443 A | 5/2011 |
| JP | 2018124837 A | 8/2018 |

\* cited by examiner

*Primary Examiner* — Amit Chatly
(74) *Attorney, Agent, or Firm* — Quarles & Brady LLP

(57) ABSTRACT

A touch panel device includes a plurality of transmission electrodes and a plurality of reception electrodes disposed in a sensing region on a substrate, the transmission electrodes and the reception electrodes forming a sensor cell, wherein the sensing region has a non-rectangle shape, a plurality of the sensor cells is arranged in the sensing region in a row direction and in a column direction, and each sensor cell has a region shape according to a shape of the sensing region such that number of the sensor cells in respective rows is the same and number of the sensor cells in respective columns is the same.

6 Claims, 11 Drawing Sheets

TOUCH PANEL DEVICE AND METHOD FOR DETECTION

CROSS-REFERENCE TO RELATED APPLICATION

This application claims the priority benefit of Japanese Patent Application No. 2020-171383 filed Oct. 9, 2020, which is fully incorporated herein by reference.

TECHNICAL FIELD

The present invention relates to a touch panel device and a method for detection performed by the touch panel device.

BACKGROUND

Various techniques are known for a touch panel device. Patent Document 1 mentioned below discloses a touch panel device of a capacitive type provided with transmission electrodes extending to a first direction and reception electrodes extending to a second direction intersecting with the first direction, in which a user's touch position is detected based on a change in capacitance generated from a detection region constituted of a pair of the transmission electrode and the reception electrode.

PRIOR ART DOCUMENT

Patent Document 1: JP 2011-90443 A

SUMMARY OF THE INVENTION

Problem to be Solved by the Invention

In implementing the touch panel device as described above to an equipment product, a shape of an outer edge of the touch panel to be implemented is not necessarily rectangle shape; it is often designed to be in a non-rectangle shape according to the design of the equipment product. In such a touch panel having the non-rectangle shape, the transmission electrodes and the reception electrodes are disposed so as to fit in this shape. In this case, however, a sufficient disposing space for the transmission electrodes and the reception electrodes may not be ensured in an outer edge portion of the touch panel. As a result, the capacitance change required for the touch position detection cannot be properly obtained at the outer edge portion of the touch panel, causing a decrease in the touch position detection accuracy.

In view of this, an object of the present invention is to maintain a touch position detection accuracy of a non-rectangle shaped touch panel.

Solution to the Problem

In order to achieve the above-described object, the present invention provides, in one aspect, a touch panel device including a plurality of transmission electrodes and a plurality of reception electrodes disposed in a sensing region on a substrate, the transmission electrodes and the reception electrodes forming a sensor cell, wherein the sensing region has a non-rectangle shape, a plurality of the sensor cells is arranged in the sensing region in a row direction and a column direction, and each sensor cell has a region shape according to a shape of the sensing region such that number of the sensor cells in respective rows is the same and number of the sensor cells in respective columns is the same.

By arranging each sensor cell in the sensing region so that the number of the sensor cells in respective rows is the same and the number of the sensor cells in respective columns is the same, defect in the sensor cell is not created regardless of the shape of the sensing region.

In the touch panel device according to the present invention described above, the plurality of transmission electrodes and the plurality of reception electrodes are disposed such that, when assuming a reference rectangle shape of the sensing region as a reference in deformation of the sensing region to the non-rectangle shape, a region shape of a rectangle shaped sensor cell that is arranged in a region of the reference rectangle shape is deformed to a non-rectangle shape by mapping the region shape of the rectangle shaped sensor cell to the sensing region using conversion coefficients obtained from vertex coordinates of the rectangle shape and vertex coordinates of the sensing region.

Thus, the region shape of each sensor cell is regularly deformed according to the shape of the non-rectangle shaped sensing region. It is thus possible to ensure a sufficient disposing space for the sensor cells at the outer edge portion of the sensing region. The term reference rectangle shape used herein refers to a sensing region having a rectangle shape as a reference in deformation of the sensing region into a non-rectangle shape. In the sensing region having the reference rectangle shape, a plurality of rectangle shaped sensor cells is regularly disposed in the row direction and in the column direction without change in their respective shapes.

In the touch panel device according to the present invention described above, the plurality of transmission electrodes and the plurality of reception electrodes are disposed such that, when assuming a reference rectangle shape of the sensing region as a reference in deformation of the sensing region to the non-rectangle shape, a region shape of a rectangle shaped sensor cell that is arranged in a region of the reference rectangle shape is deformed to a non-rectangle shape by mapping the region shape of the rectangle shaped sensor cell to the sensing region using conversion coefficients obtained from vertex coordinates of the rectangle shaped sensor cell and vertex coordinates of a sensor cell disposed in the sensing region corresponding to the rectangle shaped sensor cell.

Consequently, even in the case where the sensing region is deformed to a shape where vertex coordinates corresponding to the vertex coordinates of the reference rectangle shape cannot be determined, the region shape of each sensor cell can be deformed in accordance with the shape of the non-rectangle shaped sensing region.

In the touch panel device according to the present invention described above, the conversion coefficients may be calculated based on a bilinear transformation using the vertex coordinates of the reference rectangle shape and the vertex coordinates of the sensing region.

By deforming the sensing region based on the conversion coefficients that are calculated using the bilinear transformation, it is possible to dispose the sensor cells in the region with a mathematical regularity.

In the touch panel device according to the present invention described above, a plurality of the sensing regions may be formed on the substrate.

Consequently, for each sensing region, the sensor cells that are deformed according to the shape of each sensing region are disposed.

The touch panel device according to the present invention described above is configured to perform a step of receiving from the reception electrode a reception signal based on a transmission signal inputted to the transmission electrode, a step of calculating a center of gravity value using a capacitance value of each sensor cell obtained from the received reception signal, and a step of detecting touch position coordinates in the sensing region based on the calculated center of gravity value.

Consequently, the touch position coordinates can be detected in a state where there is no defect in the sensor cell regardless of the shape of the sensing region.

Advantageous Effect of the Invention

According to the present invention, an accuracy of detection of a touch position can be maintained in a non-rectangle shaped touch panel.

DETAILED DESCRIPTION OF THE EXEMPLARY EMBODIMENTS

Figure 1:
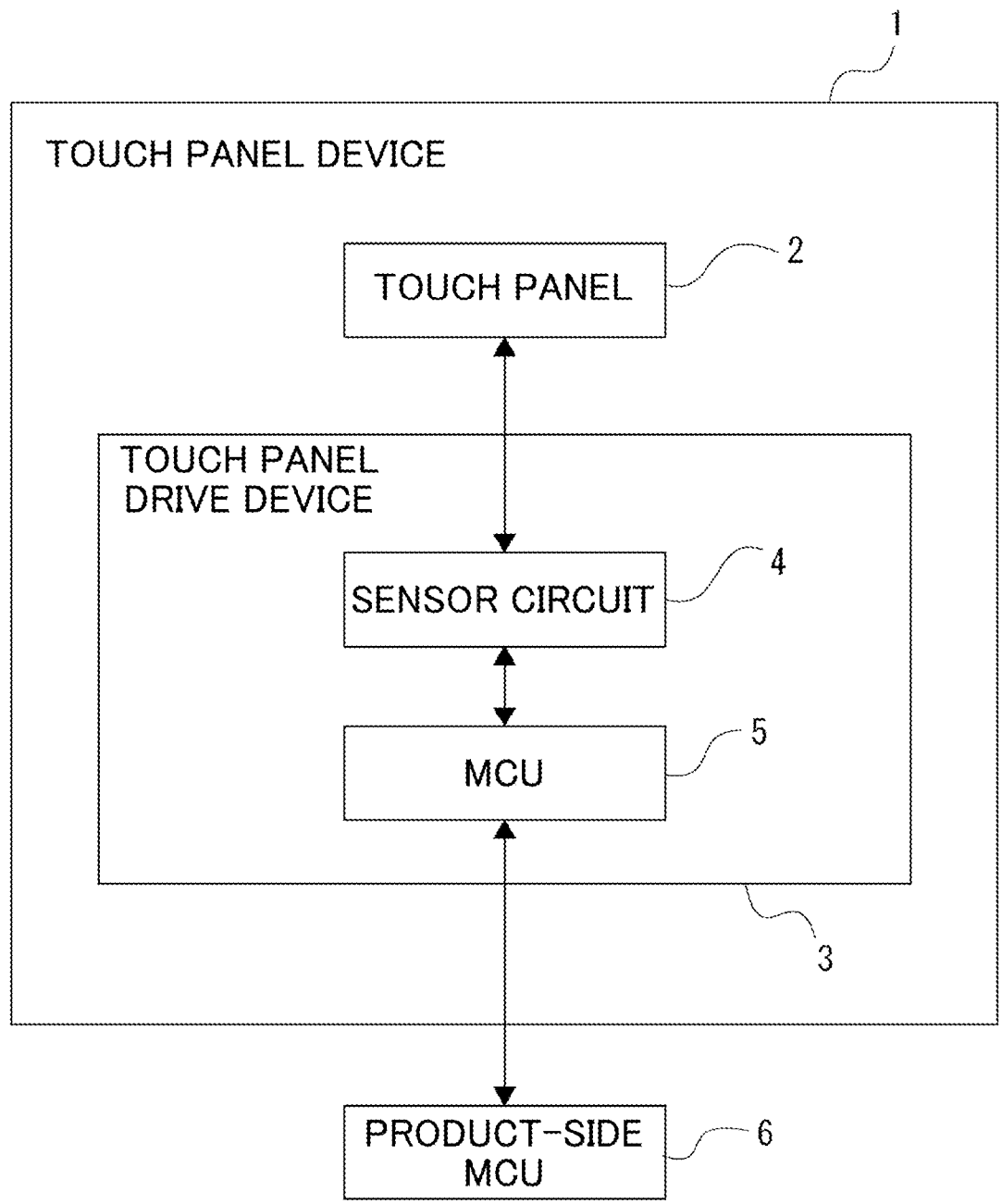
FIG. 1 is a block diagram of a touch panel device according to an embodiment of the present invention.

An embodiment of the present invention will be described with reference to FIG. 1 to FIG. 11. Various modifications can be made to configurations shown in the drawings according to design, etc., without departing from the technical idea of the present invention. Further, for configurations that are explained once, the same reference signs are provided and an explanation thereof may be omitted thereafter.

Hereinafter, an embodiment will be described in the following order:
<1. Configuration of Touch Panel Device>
<2. Electrode Arrangement Structure of Touch Panel>
<3. Method for Detecting Touch Position in Touch Panel>
<4. Comparative Example>
<5. First Embodiment>
<6. Modified Example>
<7. Second Embodiment>
<8. Summary>

1. Configuration of Touch Panel Device

A configuration example of a touch panel device 1 according to an embodiment will be described with reference to FIG. 1 and FIG. 2. The touch panel device 1 is mounted as a user interface device in various equipment. The term "equipment" used herein refers to equipment in a wide variety of fields such as electronic equipment, communication equipment, an information processing device, manufacturing facility equipment, a machine tool, a vehicle, an airplane, building facility equipment, etc. The touch panel device 1 performs an operation of supplying touch panel operation information by a conductor such as a user's finger in these various equipment products.

As shown in FIG. 1, the touch panel device 1 performs an operation of supplying information related to the operation of the touch panel by a user to a product-side MCU 6. The product-side MCU 6 is a control device in equipment on which the touch panel device 1 is mounted.

The touch panel device 1 includes a touch panel 2 and a touch panel drive device 3. The touch panel drive device 3 includes a sensor circuit 4 and a MCU 5. The touch panel drive device 3 is electrically connected to the touch panel 2 and drives the touch panel 2 (i.e., performs sensing on the touch panel 2).

In the case where the touch panel drive device 3 is mounted on equipment as an operation input device, the touch panel drive device 3 is electrically connected to the product-side MCU 6. With this connection, the touch panel drive device 3 transmits the sensed operation information to the product-side MCU 6.

The sensor circuit 4 inputs a transmission signal to the touch panel 2 and receives a reception signal from the touch panel 2.

Figure 2:
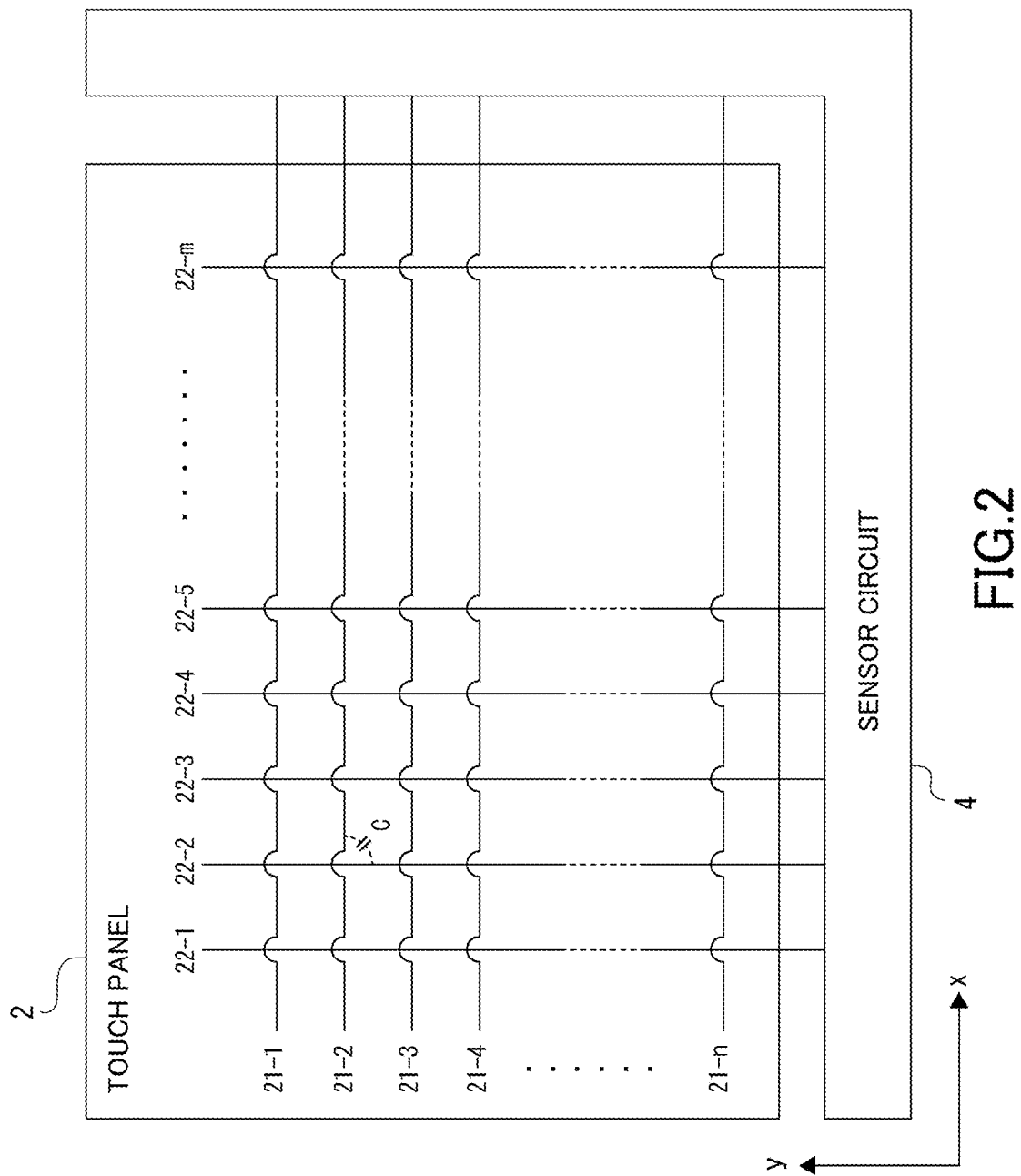
FIG. 2 is a diagram showing an electrode arrangement structure of the touch panel according to this embodiment.

FIG. 2 schematically shows a connected state of the sensor circuit 4 and the touch panel 2. In the touch panel 2, N transmission electrodes 21-1 through 21-N as electrodes on the transmission side are disposed on a panel plane that forms a touch surface. Similarly, M reception electrodes 22-1 through 22-M as electrodes on the reception side are disposed on the panel plane. In the following description, the transmission electrodes 21-1, . . . , 21-N and the reception electrodes 22-1, . . . , 22-M are collectively referred to as the transmission electrodes 21 and the reception electrodes 22, respectively, when no particular distinction needs to be made between them.

The transmission electrodes 21-1, . . . , 21-N and the reception electrode 22-1, . . . , 22-M may be disposed so as to intersect each other as shown, or may be disposed as a so-called single layer structure so as not to intersect each other as described in the following embodiment. In any case, a touch operation surface is formed within a range in which the transmission electrodes 21 and the reception electrodes 22 are disposed, providing a structure in which an operation position is detected based on a capacitance change during a touch operation.

In FIG. 2, a part of capacitance generated between the transmission electrode 21 and the reception electrode 22 is exemplary shown as capacitance C. The capacitances C generated between the transmission electrodes 21 and the reception electrodes 22 (e.g., capacitance at an intersecting position) are present on an entire touch operation surface, and a position at which the capacitance change has occurred by the touch operation is detected by the sensor circuit 4. In the following description, when distinction is made for the capacitances C generated between the transmission electrodes 21 and the reception electrodes 22, the capacitances are represented as the capacitances C1, C2, ..., with number added at the end of the reference sign.

The sensor circuit 4 outputs a transmission signal to the selected transmission electrode 21-1, ..., 21-N. Further, the sensor circuit 4 receives a reception signal from the selected reception electrode 22-1, ..., 22-M. A detected value based on the reception signal received from the reception electrode 22 (hereinafter, also referred to as a capacitance detected value) is stored in the sensor circuit 4, so that the MCU 5 can obtain it.

Returning again to FIG. 1, the MCU 5 performs setting and control of the sensor circuit 4. The MCU 5 reads out the capacitance detected values from the sensor circuit 4 and thereby obtains them. Then, the MCU 5 calculates a center of gravity value using the capacitance detected values, performs coordinate calculation based on the calculated center of gravity value, and performs processing for transmitting a coordinate value as the user's touch operation position information to the product-side MCU 6.

2. Electrode Arrangement Structure of Touch Panel

An electrode arrangement structure of the touch panel 2 will be described with reference to FIG. 3 to FIG. 4. Herein, an example of a single layer electrode structure as one example of the electrode arrangement structure is described. The electrode arrangement structure of the touch panel 2 is not limited to the single layer electrode structure and may be a laminated structure in which, for example, the transmission electrodes 21 and the reception electrodes 22 intersect each other via an insulating layer.

Figure 3:
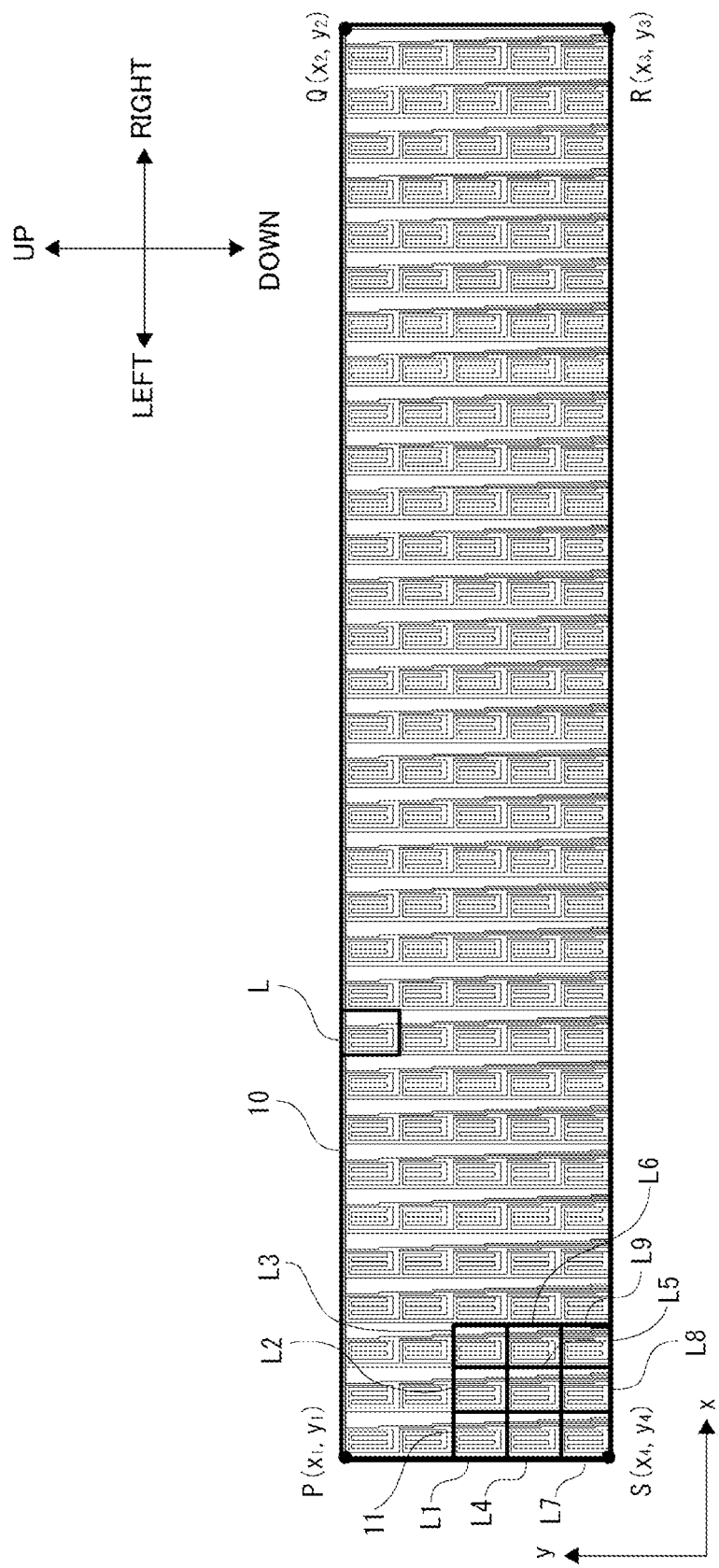
FIG. 3 is a diagram showing a sensing region in a reference rectangle shape according to this embodiment.
Figure 4:
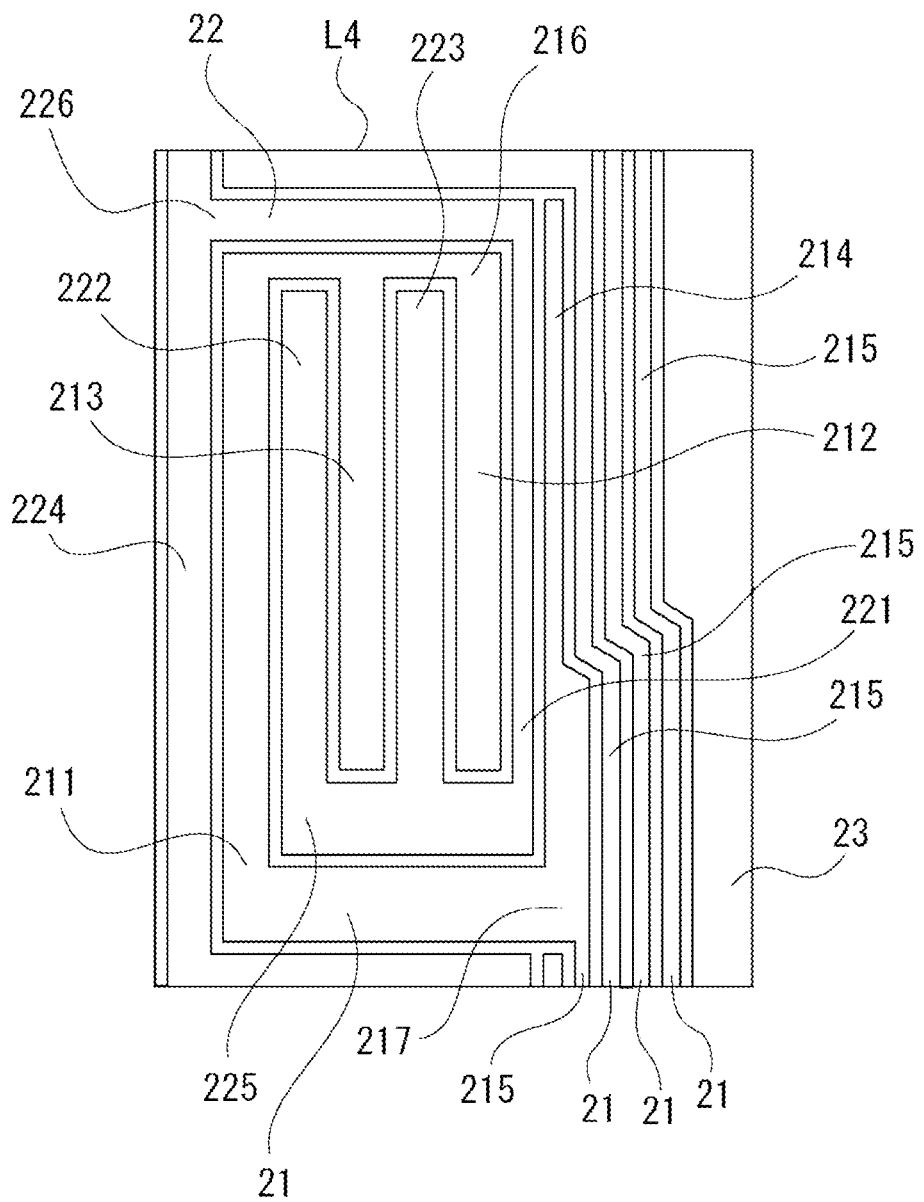
FIG. 4 is a diagram showing a sensor cell structure in a reference rectangle shape according to this embodiment.

FIG. 3 schematically shows the electrode arrangement structure of the touch panel 2 of this embodiment. In the following description, an up-down direction and a right-left direction are described corresponding to directions shown in FIG. 3, and coordinates of each sensor cell L are described based on an X-axis and a Y-axis shown in FIG. 3. The same applies to FIG. 4 through FIG. 11.

As shown in FIG. 3, on a sensing region 10 on a substrate of the touch panel 2, a plurality of sensor cells L formed in an identical rectangle shape are regularly disposed in the up-down direction and in the right-left direction (i.e., in a row direction and in a column direction), constituting a sensor pattern as a collective matrix. The number of the sensor cells L in the respective rows is the same, and the number of sensor cells L in the respective columns is also the same.

The sensing region 10 is formed in a rectangle shape. In this embodiment, this rectangle shape of the sensing region 10 is a reference shape (hereinafter, also referred to as a reference rectangle shape) referred when the sensing region 10 is deformed as described later.

A position of touch by a user, i.e., a user's touch position, is detected based on the capacitance detected value generated from each sensor cell L disposed on the sensing region 10. Each sensor cell L herein corresponds to a portion where the transmission electrode 21 and the reception electrode 22 intersect each other in FIG. 2.

The structure of the sensor cell L disposed on the sensing region 10 will be described with reference to FIG. 4. An example of the structure of the sensor cell L is explained with reference to a sensor cell L4 of FIG. 3. FIG. 4 schematically shows an enlarged view of a region shape of the sensor cell L4. For the convenience of explanation, size of and spacing between the respective elements are emphasized in FIG. 4 than FIG. 3. The sensor cell L4 includes the transmission electrode 21, the reception electrode 22 and a surplus region 23.

The transmission electrode 21 includes a first U-shaped portion 211, a first protruding portion 212, a second protruding portion 213, a wire neighboring portion 214 and a transmission wire portion 215. The first U-shaped portion 211 is formed in a U-shape that opens to the right, and the first protruding portion 212 is formed so as to protrude in the down direction from an upper end portion 216 of the first U-shaped portion 211. The second protruding portion 213 is provided on the left side of and apart from the first protruding portion 212, and is formed so as to protrude in the down direction from the first U-shaped portion 211. The wire neighboring portion 214 is formed so as to protrude in the up direction from a lower end portion 217 of the first U-shaped portion 211. The transmission wire portion 215 is extending on the opposite side of the wire neighboring portion 214.

The reception electrode 22 includes a second U-shaped portion 221, a third protruding portion 222, a fourth protruding portion 223 and a reception wire portion 224. The second U-shaped portion 221 is formed in a U-shape that opens to the left, and the third protruding portion 222 is formed so as to protrude in the up direction from a lower end portion 225 of the second U-shaped portion 221. The fourth protruding portion 223 is provided on the right side of and apart from the third protruding portion 222, and is formed to protrude in the up direction from the second U-shaped portion 221. The reception wire portion 224 is connected to an upper end portion 226 of the second U-shaped portion 221. The reception wire portion 224 is disposed apart from a left end of the first U-shaped portion 211.

The transmission electrode 21 and the reception electrode 22 are arranged in parallel in the order of, from the third protruding portion 222 to the right direction, the second protruding portion 213, the fourth protruding portion 223 and the first protruding portion 212. Thus, the transmission electrode 21 and the reception electrode 22 are formed adjacent to one another and in a single layer and in a comb shape on a plane. Further, a gap is provided in each adjacent portion where the transmission electrode 21 and the reception electrode 22 are adjacent to one another. As a result, the capacitance C is generated between the transmission electrode 21 and the reception electrode 22.

In each column in the sensing region 10 on the substrate shown in FIG. 3, the transmission wire portions 215 (the transmission electrodes 21) are drawn out for the sensor cells L disposed in the up-down direction. The respective transmission wire portions 215 are extending in the down direction and are arranged in parallel and apart from each other.

In the sensor cell L at the lower end of each column, the transmission wire portions 215 are disposed in parallel, the number of the transmission wire portions 215 being equal to the number of the sensor cells L disposed above. The number of the transmission wire portions 215 disposed on the sensor cell L decreases one by one towards the up direction.

With this decrease in the number of transmission wire portions 215 toward the sensor cells L in the up direction, a surplus region 23 is formed in the sensor cells L in the up direction. A dummy electrode, for example, is disposed in this surplus region 23 in consideration of optical appearance, for example.

The plurality of transmission wire portions 215 that is drawn out for the sensor cells L in the up-down direction in each column and that is extending in the down direction, is connected for each sensor cell L of the same row in a collective matrix on the substrate, and is connected to the sensor circuit 4 shown in FIG. 2. The sensor circuit 4 outputs a transmission signal for a sensing operation to the selected transmission electrode 21 (i.e., the transmission wire portion 215).

The reception wire portion 224 (i.e., the reception electrode 22) is drawn out in the down direction as a single electrode which is commonly connected to the upper end portion 226 of each of the sensor cells L in the up-down direction. The reception wire portion 224 drawn out in the down direction is connected to the sensor circuit 4 shown in FIG. 2. The sensor circuit 4 receives a reception signal for the sensing operation from the selected reception electrode 22 (i.e., the reception wire portion 224).

The respective sensor cells L disposed on the sensing region 10 having the reference rectangle shape shown in FIG. 3 have a substantially common configuration as the above-described sensor cell L4, although there are some differences such as the number of the transmission wire portions 215 and the rate occupied by the surplus region 23.

3. Method for Detecting Touch Position in Touch Panel

Figure 5:
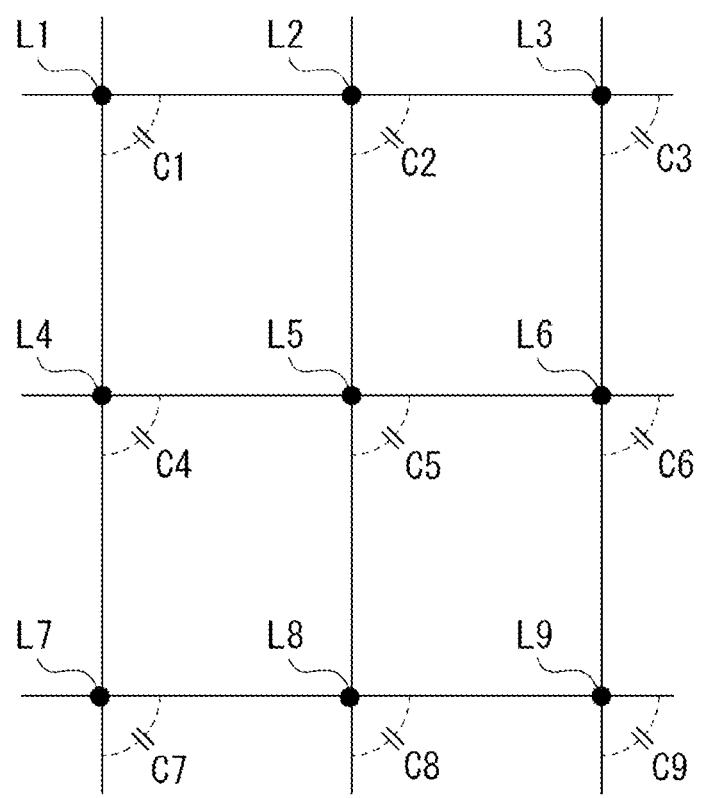
FIG. 5 is a diagram schematically showing a sensor group region in the reference rectangle shape according to this embodiment.

A method for detecting touch position information for the sensing region 10 will be described with reference to FIG. 5. As one example, the following will explain the case where touch position coordinates are detected for a sensor group region 11 formed by the sensor cells L1 to L9 shown in FIG. 3. FIG. 5 schematically shows the positional relationship between the sensor cells L1 to L9 in the sensor group region 11 and capacitances (C1 to C9) corresponding to the sensor cells L1 to L9, respectively.

The touch position coordinates on the touch panel 2 are calculated by the MCU 5 shown in FIG. 1. Specifically, the MCU 5 reads out, from the sensor circuit 4, the capacitance detected values of the capacitances C1 to C9 corresponding to the sensor cells L1 to L9, respectively, thereby obtaining them.

Then, the MCU 5 calculates a center of gravity value using the capacitance detected value of each capacitance C, and performs the coordinate calculation based on the calculated center of gravity value to calculate the touch position coordinates. Specifically, the MCU 5 calculates a coordinate Xtouch which is X-coordinate information of the touch position using the following equation (1) and by substituting the X coordinate of the sensor cell Li among the sensor cells L1 to L9 into "xi", and substituting the value of the capacitance (one of C1 to C9) corresponding to the sensor cell Li into "ci".

$$X touch = \frac{\sum_{i=1}^{9} c_i x_i}{\sum_{i=1}^{9} c_i}.$$ equation (1)

The MCU 5 further calculates a coordinate Ytouch which is Y-coordinate information of the touch position using the following equation (2) and by substituting the Y coordinate of the sensor cell Li among the sensor cells L1 to L9 into "yi" and substituting the value of the capacitance (one of C1 to C9) corresponding to the sensor cell Li into "Ci".

$$Y touch = \frac{\sum_{i=1}^{9} c_i y_i}{\sum_{i=1}^{9} c_i}.$$ equation (2)

By performing the above-described calculation, the MCU 5 can calculate the touch position coordinates for the sensing region 10 of the touch panel 2.

4. Comparative Example

A comparative example of the method for disposing the sensor cells L when the sensing region 10 is deformed from the reference rectangle shape to a non-rectangle shape will be described with reference to FIG. 6 and FIG. 7. The following will explain an example in which the sensing region 10 is deformed from the reference rectangle shape shown in FIG. 3 to a trapezoid (the non-rectangle shape) shown in FIG. 6.

Figure 6:
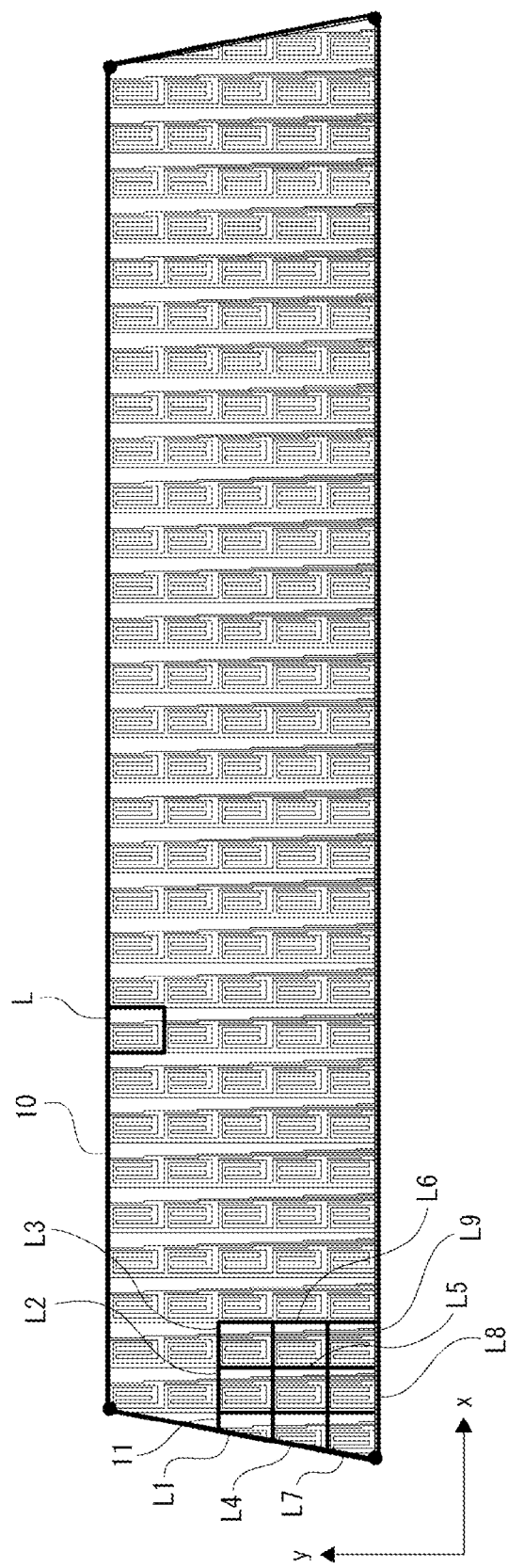
FIG. 6 is a diagram showing a sensing region in a comparative example with respect to this embodiment.

FIG. 6 schematically shows an electrode arrangement structure of the touch panel 2 of the comparative example. FIG. 7 schematically shows the sensor cells L constituting the sensor group region 11, and the capacitance C corresponding to each sensor cell L, according to the comparative example. In FIG. 7, a dash-dot-dash line shows an outer edge of the sensing region 10, and dash lines shows a defect portion of the sensor cell L.

In the right and left outer edge portions of the trapezoidal sensing region 10 as shown in FIG. 6, a disposing space for the sensor cells L is reduced by the slope, making it difficult to dispose the sensor cell L in a normal shape. For example, looking at the sensor group region 11, there are defects in the transmission electrode 21 and the reception electrode 22 of the sensor cells L1 and L4 due to the slope.

Figure 7:
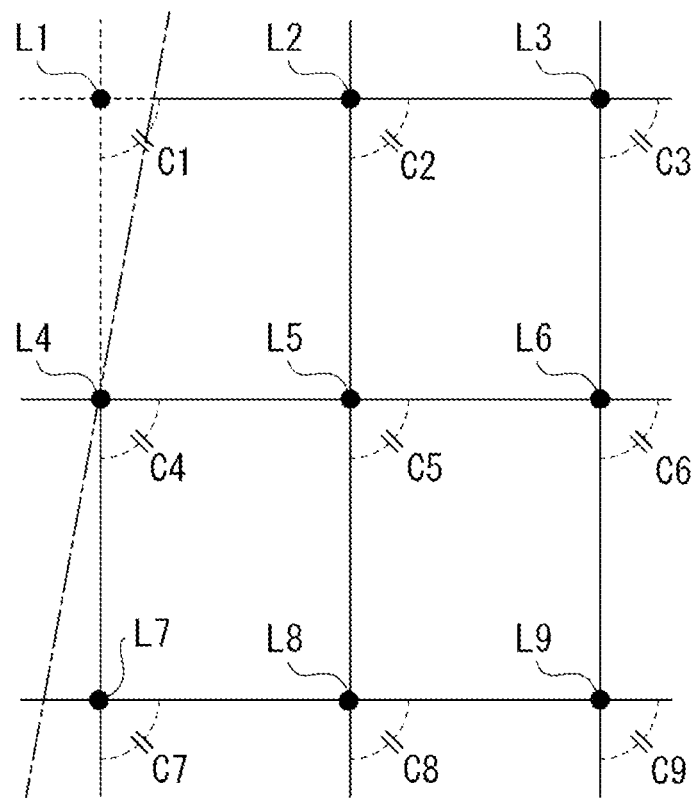
FIG. 7 is a diagram schematically showing a sensor group region in the comparative example with respect to this embodiment.

To detect the touch position coordinates in the sensor group region 11, the values of the capacitances C1 to C9 corresponding the sensor cells L1 to L9 shown in FIG. 7, respectively, need to be substituted into the above-mentioned equation (1) and equation (2).

In the comparative example, however, since there are defects in the electrode portions of the sensor cells L1 and L4, the capacitance detected values for the capacitance C1 of the sensor cell L1 and the capacitance C4 of the sensor cell L4 are altered (or cannot be detected), causing a decrease in the accuracy of the touch position coordinates obtained using the equation (1) and the equation (2).

5. First Embodiment

Figure 8:
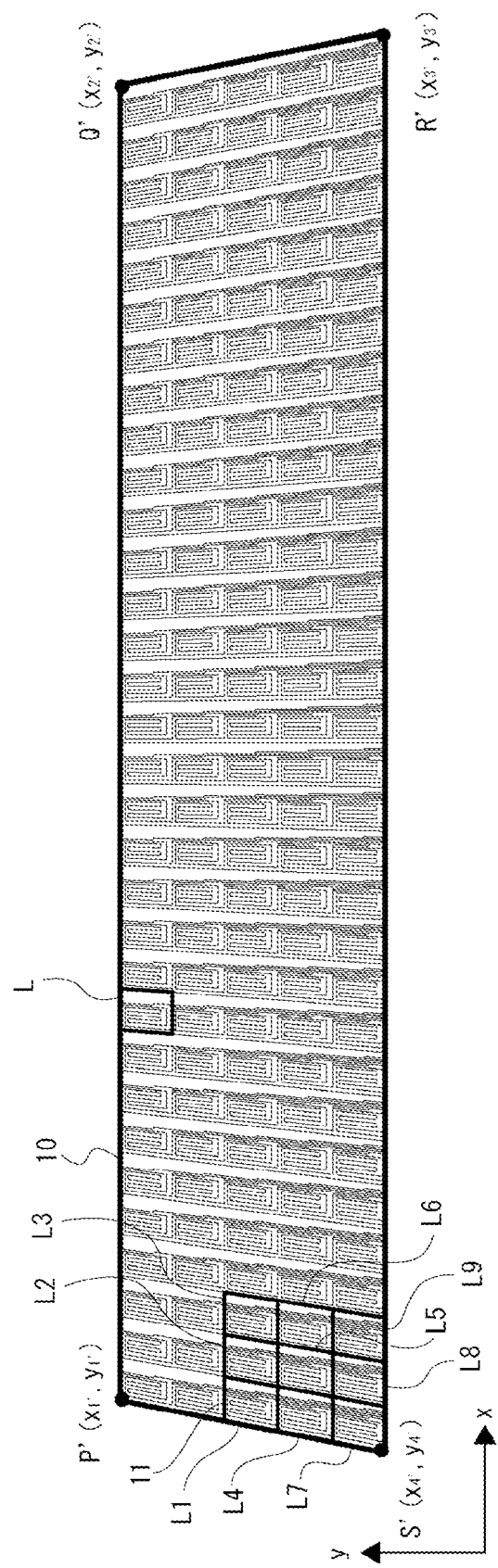
FIG. 8 is a diagram showing a sensing region in a non-rectangle shape according to this embodiment.
Figure 9:
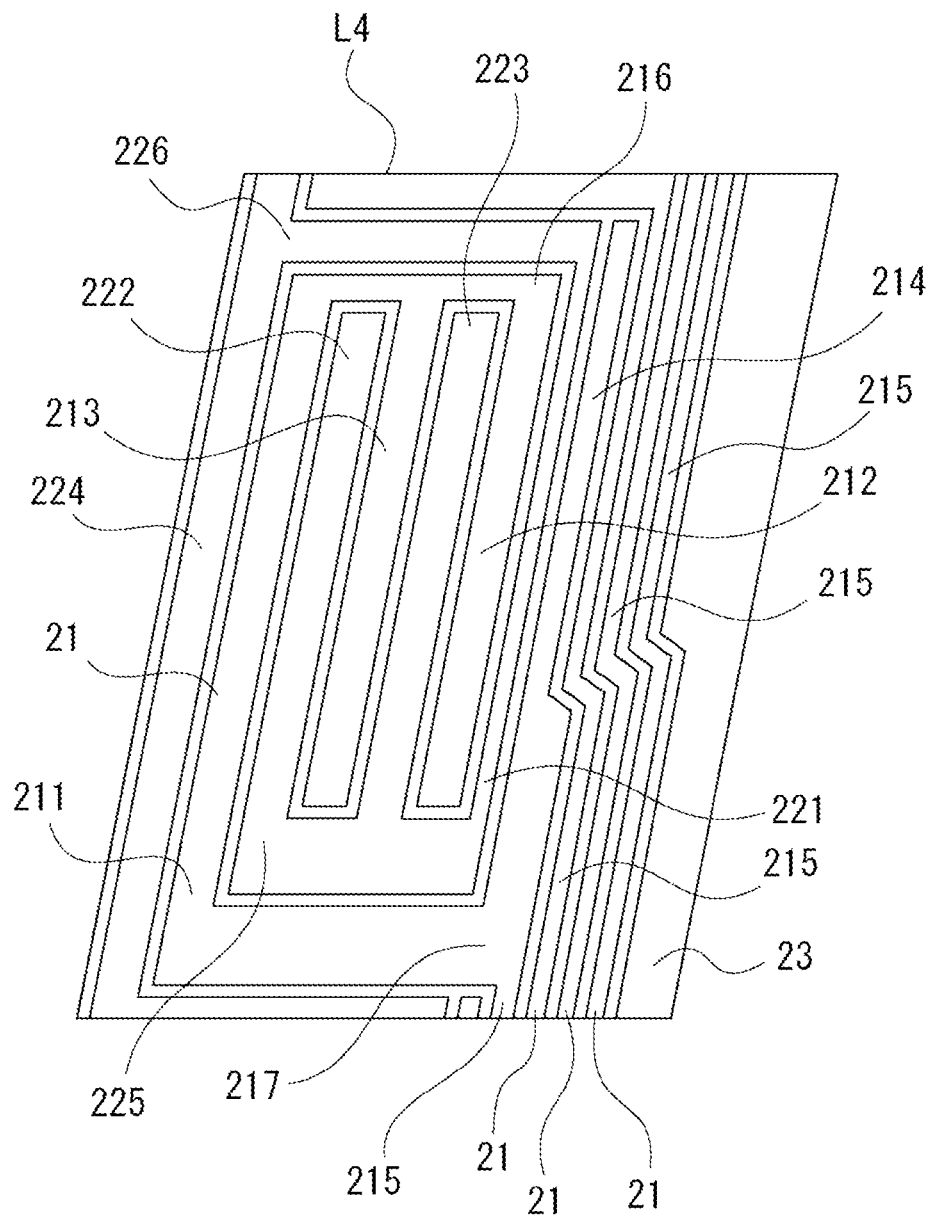
FIG. 9 is a diagram showing a sensor cell structure in the non-rectangle shape according to this embodiment.
Figure 10:
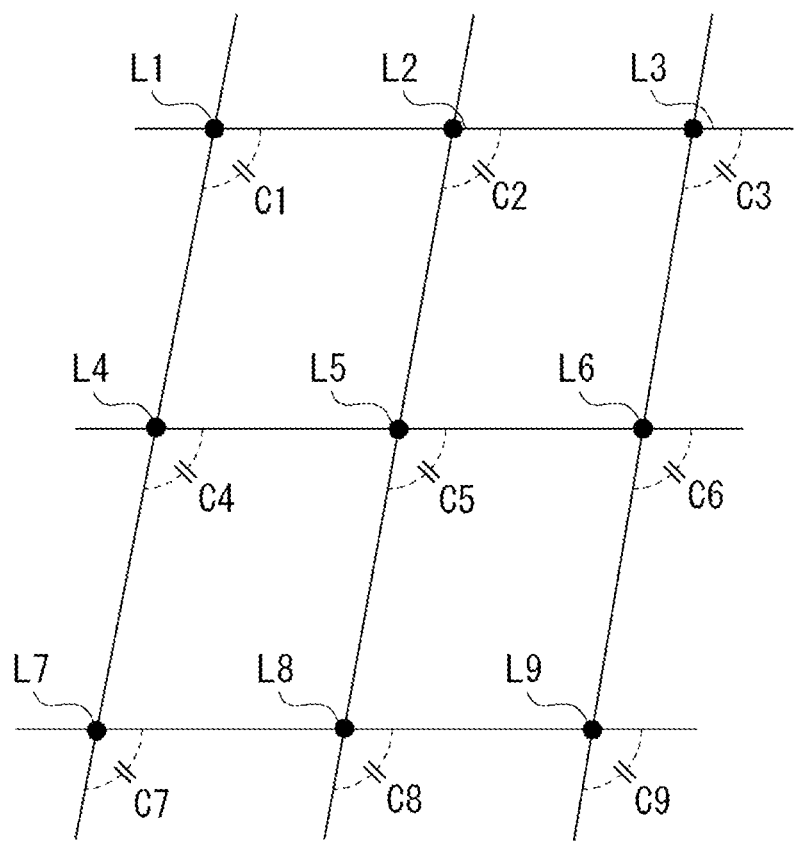
FIG. 10 is a diagram schematically showing a sensor group region in a non-rectangle shape according to this embodiment.

A first embodiment of a method for disposing the sensor cells L in the sensing region 10 will be described with reference to FIG. 8 to FIG. 10. As with the comparative example, the following will explain an example in which the sensing region 10 is deformed from the reference rectangle shape shown in FIG. 3 to a trapezoid (the non-rectangle shape) shown in FIG. 8. FIG. 8 schematically shows an electrode arrangement structure when the sensing region 10 is deformed to the trapezoid. FIG. 9 shows an enlarged view of the sensor cell L4 in the sensor group region 11 in this sensing region 10. FIG. 10 schematically shows the sensor cells L constituting the sensor group region 11 and the capacitances C corresponding to the sensor cells L, respectively. For convenience of explanation, size of and spacing between the respective elements are emphasized in FIG. 9 than FIG. 8.

In this embodiment, when assuming the reference rectangle shape as shown in FIG. 3 which is a reference for the sensing region 10, the respective coordinates of the sensor cells L formed in the region of the reference rectangle shape are converted into the respective coordinates of the sensor cells L formed in the region of the trapezoid using conversion coefficients obtained from vertex coordinates of the reference rectangle shape and vertex coordinates of the trapezoidal sensing region 10. The converted respective coordinates are then mapped to the trapezoidal sensing region 10, and the plurality of transmission electrodes 21 and the plurality of reception electrodes 22 are disposed based on this mapping.

In the following, a specific example of a method for converting respective coordinates in the region of the reference rectangle shape to respective coordinates in the region of the trapezoidal sensing region 10 will be explained. The following will explain an example in which the respective coordinates are calculated using bilinear transformation.

Assuming that certain coordinates in the region of the reference rectangle shape are (x, y) and that coordinates in the region of the trapezoid after the deformation corresponding to the coordinates in the region of the reference rectangle shape are (x', y'), each coordinate in (x', y') is calculated using the following equation (3) and equation (4):

$$x'=a1x+b1y+c1xy+d1 \quad \text{equation (3); and}$$

$$y'=a2x+b2y+c2xy+d2 \quad \text{equation (4).}$$

At this moment, the conversion coefficients a1, b1, c1, d1, a2, b2, c2, d2 in the equation (3) and equation (4) are unknown.

Thus, firstly, a vertex P(x1, y1), a vertex Q(x2, y2), a vertex R(x3, y3) and a vertex S(x4, y4) which are respective vertex coordinates of the reference rectangle shape as shown in FIG. 3, and a vertex P'(x1', y1'), a vertex Q'(x2', y2'), a vertex R'(x3', y3') and a vertex S'(x4', y4') which are respective vertex coordinates of the trapezoid as shown in FIG. 8 after the deformation and which correspond to the respective vertex coordinates of the reference rectangle shape, are substituted into the equation (3). Consequently, a system of equations consisting of the following four equations is obtained:

$$x1'=a1x1+b1y1+c1x1y1+d1;$$

$$x2'=a1x2+b1y2+c1x2y2+d1;$$

$$x3'=a1x3+b1y3+c1x3y3+d1; \text{ and}$$

$$x4'=a1x4+b1y4+c1x4y4+d1.$$

Using this system of equations, the conversion coefficients a1, b1, c1, d1 in the equation (3) are calculated.

Further, the vertex P(x1, y1), the vertex Q(x2, y2), the vertex R(x3, y3) and the vertex S(x4, y4) which are respective vertex coordinates the reference rectangle shape, and the vertex P'(x1', y1'), the vertex Q'(x2', y2'), the vertex R'(x3', y3') and the vertex S'(x4', y4') which are respective vertex coordinates of the trapezoid after the deformation corresponding to the respective vertex coordinates of the reference rectangle shape, are substituted into the equation (4). Consequently, a system of equations consisting of the following four equations is obtained:

$$y1'=a2x1+b2y1+c2x1y1+d2;$$

$$y2'=a2x2+b2y2+c2x2y2+d2;$$

$$y3'=a2x3+b2y3+c2x3y3+d2; \text{ and}$$

$$y4'=a2x4+b2y4+c2x4y4+d2.$$

Using this system of equations, the conversion coefficients a2, b2, c2, d2 in the equation (4) are calculated.

Thus, the respective conversion coefficients in the equation (3) and the equation (4) are now known. Thus, by substituting the coordinates in the reference rectangle shape before the deformation into the equation (3) and the equation (4), the coordinates in the region of the trapezoid after the deformation can be obtained.

Subsequently, the respective coordinates of the sensor cells L constituting the reference rectangle shape are substituted into the equation (3) and the equation (4) and are converted to the respective coordinates in the sensing region 10 of the trapezoid after the deformation to perform the mapping. By disposing the transmission electrode 21 and the reception electrode 22 based on the mapping, the sensing region 10 constituted of the regularly converted sensor cells L as shown in FIG. 8 is formed.

By changing the shape of the sensor cells L to be disposed in the sensing region 10 using the bilinear transformation, the sensor cells L can be disposed easily in the region of the sensing region 10 after the deformation. For example, looking at the sensor cell L4 near the outer edge of the trapezoid shown in FIG. 9, there are no defects as those shown in the comparative example, thus it can be seen that the sufficient region for disposing the transmission electrode 21 and the reception electrode 22 is ensured.

Consequently, in the detection of the touch position coordinates in the sensor group region 11, for example, the capacitance detected values of the capacitances (C1 to C9) corresponding to the sensor cells L1 to L9 as shown in FIG. 10, respectively, can be detected sufficiently. By substituting the capacitance detected value of each capacitance C detected into the equation (1) and the equation (2) mentioned above, it is possible to accurately detect the touch position coordinates. According to this embodiment, even when the sensing region 10 is deformed to the non-rectangle shape, it is possible to produce a sensor pattern while maintaining the accuracy of detection of the touch position coordinates.

6. Modified Example

The first embodiment describes the example in which the coordinates of the respective sensor cells L in the sensing region 10 after the deformation are calculated using the conversion coefficients obtained from the respective vertex coordinates of the reference shape before the deformation (FIG. 3) and the respective vertex coordinates of the sensing region 10 after the deformation (FIG. 8); however, the method for calculating the coordinates of the respective sensor cells L is not limited thereto. For example, the conversion coefficients obtained from the respective vertex coordinates of the rectangle shaped sensor cell L in the reference rectangle shape before the deformation (FIG. 3) and respective vertex coordinates of the corresponding sensor cell L in the sensing region 10 after the deformation (FIG. 8) can be used to determine the shape of the transmission electrode 21 and the reception electrode 22 constituting each sensor cell L in the sensing region 10 after the deformation.

Specifically, the conversion coefficients a1, b1, c1, d1 are calculated by substituting the respective vertex coordinates of the rectangle shaped sensor cell L before the deformation and the respective vertex coordinates of the sensor cell L after the deformation into the equation (3). Further, the conversion coefficients a2, b2, c2, d2 are calculated by substituting the respective vertex coordinates of the rectangle shaped sensor cell L before the deformation and the respective vertex coordinates of the sensor cell L after the deformation into the equation (4).

Then, the coordinates of each point in the region constituting the transmission electrode 21 and the reception electrode 22 in the region of the sensor cell L before the deformation are substituted into the equation (3) and the equation (4), thereby the coordinates are converted into the coordinates in the sensing region 10 after the deformation to perform the mapping. By performing the mapping for all the sensor cells L in the reference rectangle shape, it is possible to determine the region shape of each sensor cell L to be arranged in the sensing region 10 after the deformation. By disposing the transmission electrode 21 and the reception electrode 22 based on the mapping, the sensing region 10 constituted of the regularly converted sensor cells L is formed, as with the calculation method according to the embodiment described above. This calculation method is particularly useful in the case where the sensing region 10 is deformed to a complex shape where four vertices cannot be identified.

7. Second Embodiment

Figure 11:
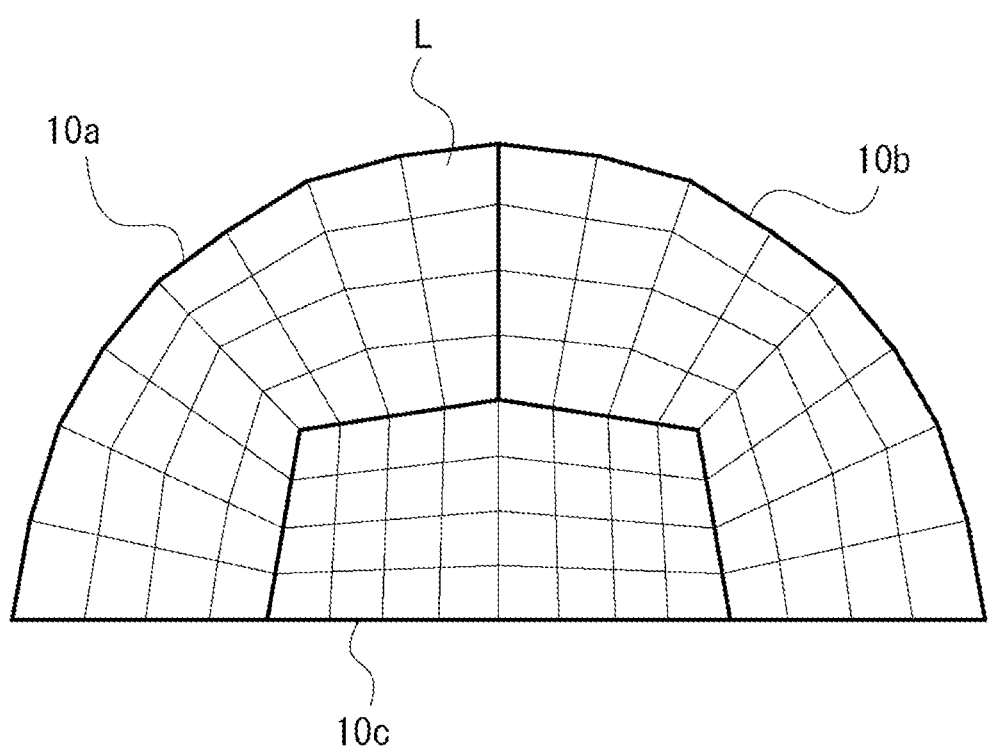
FIG. 11 is a diagram showing an arrangement of the sensing region on a substrate according to this embodiment.

A second embodiment of the method for disposing the sensor cells L in the sensing region 10 will be described with reference to FIG. 11. The second embodiment is an example in which a plurality of sensing regions 10 is formed on a substrate of the touch panel 2. FIG. 11 shows an example of arrangement of the sensing region 10 on the substrate. In this embodiment, respective sensing regions of the plurality of sensing regions 10 are distinguished and described as sensing regions 10a, 10b, 10c. In FIG. 11, for convenience of explanation, configurations of the transmission electrode 21 and the reception electrode 22 and such in each sensor cell L are not shown.

In this embodiment, the region for disposing the transmission electrode 21 and the reception electrode 22 on the substrate is divided into a plurality of sensing regions 10a, 10b, 10c, as shown in FIG. 11. Then, a sensor pattern is produced for each of the divided sensing regions 10, and the transmission electrode 21 and the reception electrode 22 are disposed in accordance with the produced sensor pattern.

The sensing regions 10a, 10b, 10c have a shape in which vertices corresponding to those of the reference rectangle shape cannot be determined. Thus, as in the above-described modified example, the region shape of each sensor cell L is deformed by mapping the region shape of the sensing region 10 after the deformation using the conversion coefficients obtained from the respective vertex coordinates of the rectangle shaped sensor cell L in the reference rectangle shape before the deformation and the respective vertex coordinates of the corresponding sensor cell L in the sensing region 10 after the deformation. In the case where the sensing region 10 has a shape where vertices corresponding to those of the reference rectangle shape can be determined, the method according to the first embodiment described above can be applied.

According to this embodiment, by separately deforming the respective sensing regions 10 obtained by dividing the region of the substrate, the accuracy of detection of the touch position coordinates on each sensing region 10 can be maintained. Thus, even when the shape of the substrate on which the sensor cells L are disposed is complicated, the accuracy of detection of the touch position coordinates on the entire substrate can be maintained.

8. Summary

The touch panel device 1 according to the above-described embodiment is the touch panel device 1 including the plurality of transmission electrodes 21 and the plurality of reception electrodes 22 that are disposed in the sensing region 10 on the substrate, the transmission electrodes 21 and the reception electrodes 22 forming the sensor cell L, wherein the sensing region 10 has the non-rectangle shape, the plurality of sensor cells L is arranged in the sensing region 10 in the row direction and in the column direction, and each sensor cell L has the region shape according to the shape of the sensing region 10 such that the number of the sensor cells L in respective rows is the same and the number of the sensor cells L in respective columns is the same (refer to e.g., FIG. 3 and FIG. 8).

By arranging each sensor cell L in the sensing region 10 such that the number of the sensor cells L in respective rows is the same and the number of the sensor cells L in respective columns is the same, the defect in the sensor cell L as shown in FIG. 6 is not created. Thus, it is possible to calculate the center of gravity value based on the capacitance detected value of each sensor cell L as shown in FIG. 10 without impairing the accuracy. Thus, the touch position detection accuracy of the touch panel 2 having the non-rectangle shaped sensing region 10 can be maintained.

In the touch panel device 1 of the embodiment, the plurality of transmission electrodes 21 and the plurality of reception electrodes 22 are disposed such that, when assuming the reference rectangle shape of the sensing region 10 as a reference in the deformation of the sensing region 10 to the non-rectangle shape, the region shape of the rectangle shaped sensor cell L that is arranged in the region of the reference rectangle shape is deformed to a non-rectangle shape by mapping the region shape of the rectangle shaped sensor cell L to the sensing region 10 using the conversion coefficients obtained from the vertex coordinates (P, Q, R, S) of the reference rectangle shape and the vertex coordinates (P', Q', R', S') of the sensing region 10 (refer to e.g., FIG. 3 and FIG. 8).

Thus, the shape of each sensor cell L is regularly deformed in accordance with the shape of the non-rectangle shaped sensing region 10. Thus, a sufficient disposing space for the sensor cells L can be ensured at the outer edge portion of the sensing region 10 as shown in FIG. 8. Thus, it is possible to prevent a decrease in the accuracy of detection of the touch position coordinates due to failure in detecting the capacitance change of the sensor cell L at the outer edge portion, thereby enabling to maintain the accuracy of detection of the touch position of the touch panel 2 having the non-rectangle shaped sensing region 10.

In the embodiment, as explained in the modified example described above, the plurality of transmission electrodes 21 and the plurality of reception electrodes 22 can be disposed such that, when assuming the reference rectangle shape of the sensing region 10 as a reference in the deformation of the sensing region 10 to the non-rectangle shape, the region shape of the rectangle shaped sensor cell L arranged in the region of the reference rectangle shape is deformed to the non-rectangle shape by mapping the region shape of the rectangle shaped sensor cell to the sensing region 10 using the conversion coefficients obtained from the vertex coordinates of the rectangle shaped sensor cell L and the vertex coordinates of the sensor cell L arranged in the sensing region 10 corresponding to the rectangle shaped sensor cell L.

Thus, even in the case where the sensing region 10 is deformed to shapes such as those of the sensing regions 10a, 10b, 10c shown in FIG. 11 in which the vertex coordinates corresponding to the vertex coordinates of the reference rectangle shape cannot be determined, the region shape of each sensor cell L can be deformed in accordance with the shape of the non-rectangle shaped sensing region 10. It is thus possible to maintain the accuracy of detection of the touch position of the touch panel 2 having the non-rectangle shaped sensing region 10.

In the touch panel device 1 of the embodiment, the conversion coefficients are calculated based on the bilinear transformation using the vertex coordinates (P, Q, R, S) of the reference rectangle shape and the vertex coordinates (P', Q', R', S') of the sensing region 10 (refer to e.g., FIG. 5, FIG. 9, the equation (3), the equation (4)).

By deforming the sensing region 10 based on the conversion coefficients calculated using the bilinear transformation, it is possible to dispose the sensor cells L in the region with a mathematical regularity, thereby enabling to maintain the touch position detection accuracy of the touch panel 2 having the non-rectangle shaped sensing region 10.

The plurality of sensing regions 10a, 10b, 10c is formed on the substrate in the touch panel device 1 according to the second embodiment (refer to e.g., FIG. 11).

Thus, for each sensing region 10, the sensor cells L which are deformed in accordance with the shape of each sensing region 10 is disposed. Thus, by combining the plurality of sensing regions 10, it is possible to maintain the touch position detection accuracy even in the touch panel 2 having a complicated substrate shape.

The touch panel device 1 according to the embodiment is configured to perform the step of receiving from the reception electrode the reception signal based on the transmission signal inputted to the transmission electrode, the step of calculating the center of gravity value using the capacitance value of each sensor cell obtained from the received reception signal, and the step of detecting the touch position coordinates in the sensing region based on the calculated center of gravity value (refer to FIG. 3, FIG. 8, the equation (1), the equation (2)).

Consequently, the touch position coordinates can be detected in a state where there is no defect in the sensor cell L regardless of the shape of the sensing region 10. Thus, it is possible to maintain the touch position detection accuracy of the touch panel 2 having the non-rectangle shaped sensing region 10.

It should be understood that each embodiment described above is only an example of the present invention, and the present invention is not limited thereto. That is, various modifications made within the range that can achieve the object of the present invention are within the present invention. Further, the advantageous effect described in this description is illustrative only, and other advantageous effect may be provided.

LIST OF REFERENCE SIGNS

1 touch panel device
2 touch panel
10 sensing region
21 transmission electrode
22 reception electrode
L sensor cell

What is claimed is:

1. A touch panel device comprising a plurality of transmission electrodes and a plurality of reception electrodes disposed in a sensing region on a substrate, the transmission electrodes and the reception electrodes forming a sensor cell, wherein the sensing region has a non-rectangle shape, a plurality of the sensor cells is arranged in the sensing region in a row direction and a column direction, and each sensor cell has a region shape according to a shape of the sensing region such that number of the sensor cells in respective rows is same and number of the sensor cells in respective columns is same, wherein, the plurality of transmission electrodes and the plurality of reception electrodes are disposed such that, when assuming a reference rectangle shape of the sensing region as a reference in deformation of the sensing region to the non-rectangle shape, a region shape of a rectangle shaped sensor cell that is arranged in a region of the reference rectangle shape is deformed to a non-rectangle shape by mapping the region shape of the rectangle shaped sensor cell to the sensing region using conversion coefficients obtained from vertex coordinates of the rectangle shape and vertex coordinates of the sensing region.

2. The touch panel device according to claim 1, wherein the conversion coefficients are calculated based on a bilinear transformation using the vertex coordinates of the reference rectangle shape and the vertex coordinates of the sensing region.

3. The touch panel device according to claim 1, wherein a plurality of the sensing regions is formed on the substrate.

4. A method for detection performed by the touch panel device according to claim 1, the method comprising steps that are performed by the touch panel device, the steps including:

a step of receiving from the reception electrode a reception signal based on a transmission signal inputted to the transmission electrode;

a step of calculating a center of gravity value using a capacitance value of each sensor cell obtained from the received reception signal; and a step of detecting touch position coordinates in the sensing region based on the calculated center of gravity value.

5. A touch panel device comprising a plurality of transmission electrodes and a plurality of reception electrodes disposed in a sensing region on a substrate, the transmission electrodes and the reception electrodes forming a sensor cell, wherein the sensing region has a non-rectangle shape, a plurality of the sensor cells is arranged in the sensing region in a row direction and a column direction, and each sensor cell has a region shape according to a shape of the sensing region such that number of the sensor cells in respective rows is same and number of the sensor cells in respective columns is same, wherein, the plurality of transmission electrodes and the plurality of reception electrodes are disposed such that, when assuming a reference rectangle shape of the sensing region as a reference in deformation of the sensing region to the non-rectangle shape, a region shape of a rectangle shaped sensor cell that is arranged in a region of the reference rectangle shape is deformed to a non-rectangle shape by mapping the region shape of the rectangle shaped sensor cell to the sensing region using conversion coefficients obtained from vertex coordinates of the rectangle shaped sensor cell and vertex coordinates of a sensor cell disposed in the sensing region corresponding to the rectangle shaped sensor cell.

6. The touch panel device according to claim 5, wherein the conversion coefficients are calculated based on a bilinear transformation using the vertex coordinates of the rectangle shaped sensor cell and the vertex coordinates of the sensor cell disposed in the sensing region corresponding to the rectangle shaped sensor cell.

\* \* \* \* \*